United States Patent
Kadokura et al.

[15] 3,681,670
[45] Aug. 1, 1972

[54] MOTOR CONTROL WITH PULSE COMPARISON MEANS

[72] Inventors: Sadao Kadokura; Kazuchika Miura, both of Mihara, Japan

[73] Assignee: Teijin Limited, Osaka, Japan

[22] Filed: June 14, 1971

[21] Appl. No.: 152,727

Related U.S. Application Data

[63] Continuation-in-part of Ser. No. 855,449, Aug. 18, 1969, abandoned.

[30] Foreign Application Priority Data

Feb. 13, 1969 Japan..........................44/10642
Aug. 19, 1968 Japan..........................43/59084

[52] U.S. Cl....................................................318/318
[51] Int. Cl................................................H02p 5/16
[58] Field of Search..........................318/314, 318

[56] References Cited

UNITED STATES PATENTS 3,361,949   1/1968   Brown...........................318/314
3,582,541   6/1971   Hebb............................318/314

*Primary Examiner*—Bernard A. Gilheany
*Assistant Examiner*—Thomas Langer
*Attorney*—E. F. Wenderoth et al.

[57] ABSTRACT

An automatic controller for a device such as a rotary motor has a pulse generation mechanism for generating two reference pulse trains which are antiphase with each other. A detecting device detects a controlled variable of the controlled device and generates a detected pulse train having a pulse repetition rate corresponding to the controlled variable. The detected pulse train and one of the reference pulse trains are fed to a pulse position modulator which synchronizes the detected pulse trains with one of the reference pulse trains. The synchronized pulse train and the other of the reference pulse trains are fed to a comparison circuit for generating pulse signals corresponding to the difference between the pulse repetition rate of the synchronized pulse train and the other reference pulse train. A converting circuit converts the pulse signals into rectangular wave signals having a rectangular wave of predetermined width and voltage, and an integrating circuit integrates differentially the rectangular wave signals and reference voltage signal. The output of the integrating circuit controls a manipulated variable of a regulator for the controlled device so that the controlled variable attains a desired value.

2 Claims, 5 Drawing Figures

SADAO KADOKURA and
KAZUCHIKA MIURA, Inventors

MOTOR CONTROL WITH PULSE COMPARISON MEANS

This application is a continuation-in-part of application Ser. No. 855,449 filed Aug. 18, 1969 and now abandoned.

The present invention relates to controllers in various control systems, such as an automatic controller of electro-hybrid type, more particularly a controller in a velocity control system. For example, it is well adapted for the velocity control of a rotary machine.

The properties required for a controller are;
1. High control accuracy,
2. Rapid response,
3. Good reliability,
4. Simple circuitry,
5. Low cost of manufacture,
6. Ability to change continuously and at will the velocity to be controlled,
7. Compactness of structure.

Heretofore, for controlling the velocity of a rotary machine, velocity controllers of an analog type or of an electro-hybrid type have been used.

A velocity controller of conventional analog type compares a detected voltage corresponding to the velocity with a reference voltage and controls the velocity to reduce to zero the difference between the two voltages.

In the case of the velocity controller of the conventional analog type, however, it is difficult to control the velocity with an accuracy of 0.1 percent or above. The reason is that the reference voltage and the detected voltage of a tacho-generator for detecting the velocity vary with temperature, variation in DC power supply, etc., and that there is a problem of the drift of the amplifier for amplifying the difference between the two voltages.

A velocity controller of conventional electro-hybrid type is composed of a reversible counter for accumulating the difference between the pulses of a detected frequency corresponding to the velocity and the pulses of a reference frequency according to the desired value of the velocity, a digital analog converter for converting the output of the reversible counter to analog as a deviation input for an analog control device and an analog control device for controlling the velocity so that the deviation input is reduced to zero.

In a velocity controller of conventional electro-hybrid type, it is easy to improve the control accuracy to 0.1 percent or above because the velocity is set by a digital signal, but the mechanism of the controller is complicated due to the necessity for a reversible counter, a D-A converter, an amplifier, a circuit for modulating the conditions of the signals at the inputs of an integrating circuit and so on. Further in order to make the controller more responsive, it is necessary to add a proportional position action to an integral action. Consequently the controller of conventional electro-hybrid type can not be manufactured inexpensively and is lacking in compactness. Moreover it has a tendency to have less reliability of control due to the large number of parts.

The present invention has succeeded in achieving a given purpose by comparatively easy steps and with a relatively simple system by eliminating the defects of conventional device for automatic control.

The present invention is to provide a controller of electro-hybrid type combining both the features of the anolog and the digital system, which satisfies requirements of various operating conditions.

In this system there are two reference inputs and one feedback input, that is, a reference pulse signal of digital type and a reference voltage signal of analog type as reference inputs and a detected pulse signal of digital type as a feedback input.

The pulse repetition rate of the reference pulse signal is set by a predetermined value above or below that of the detected pulse signal which is generated when the controlled variable of a controlled device is equal to a desired value.

Here the term pulse repetition rate is used not only when pulse intervals are regular pulses but also they are irregular pulses and means the number of recurrent pulses per second.

This system is provided with a comparison circuit for two types of pulse signal in which the pulse signal having a pulse repetition rate corresponding to the difference of pulse repetition rate of two types of pulse signal is made an output. Here the pulse train means a train of pulse signal generating about at the same intervals. This comparison circuit for two types of pulse signal which does not require a reversible counter, is a simple circuit composed of a few flip-flop circuits, AND gates and pulse converters and makes an instant response automatically to an input. The mechanism of the comparison circuit for two types of pulse signal will be described in detail later.

The reference pulse and detected pulse signals are led into the comparison circuit for two types of pulse signal. Then the output pulse signal of the comparison circuit for two types of pulse signal is converted into a rectangular wave signal synchronizing with the output signal and having waves of constant width and voltage. Successively the rectangular wave signal and the reference voltage signal are led into a differential integrator in the system.

The output of the differential integrator is fed to a regulator for controlled device and actuates a manipulated variable of the regulator so that the controlled variable is equal to a desired value.

The reference pulse signal and the detected pulse signal are the same as those of conventional digital system and the reference voltage signal is the same as those of conventional analog system. But in the system of the present invention, defects of analog system have almost been eliminated by leading the rectangular wave signal and the reference voltage signal to a differential integrator, and the circuitry which is a defect of digital system, has been simplified.

The differential integrator of the present invention, which integrates the rectangular wave signal, achieves performance and effect similar to the D-A converter and amplifier circuit of the conventional analog system. Furthermore the differential integrator has an integrating action similar to an accumulating action of the reversible counter of conventional digital system. According to the present invention, there is no need to modulate the signal-handling conditions at the input to the integrating circuit in conventional digital system, and as in conventional analog system, the response in the control system can be enhanced.

Further by varying the value of the reference voltage signal, the desired value of the controlled variable could be changed without varying the pulse repetition rate of the reference pulse signal, and the controlled variable could be controlled with a control accuracy of 0.1 percent or above. Therefore the control system of the present invention is applicable to a plurality of controlled devices by using a common reference pulse signal.

It is an object of the present invention to provide an automatic controller capable of actuating a manipulated variable for a controlled device in response to difference in the pulse repetition rate between the reference pulse signal and the detected pulse signal from the controlled device.

It is a further object of the invention to provide an automatic controller having a high control accuracy, a good response, a good dependability, a simple circuitry and a low manufacturing cost.

The present invention will be described below with reference to the accompanying drawings.

Figure 1:
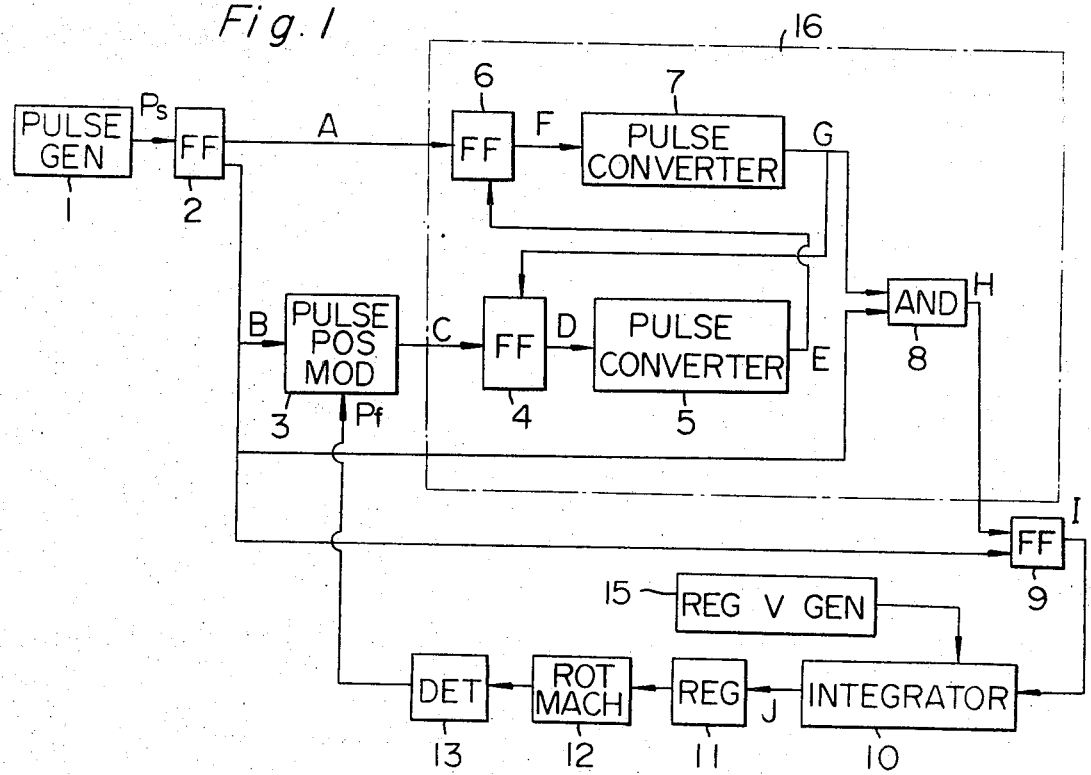
FIG. 1 is a block diagram showing an embodiment of an automatic controller according to the present invention.

In FIG. 1, a setting pulse signal $P_s$ generated by a pulse generator 1 is supplied to a flip-flop circuit (bistable multivibrator) 2 and is there converted into two reference pulse signals A and B.

Figure 3:
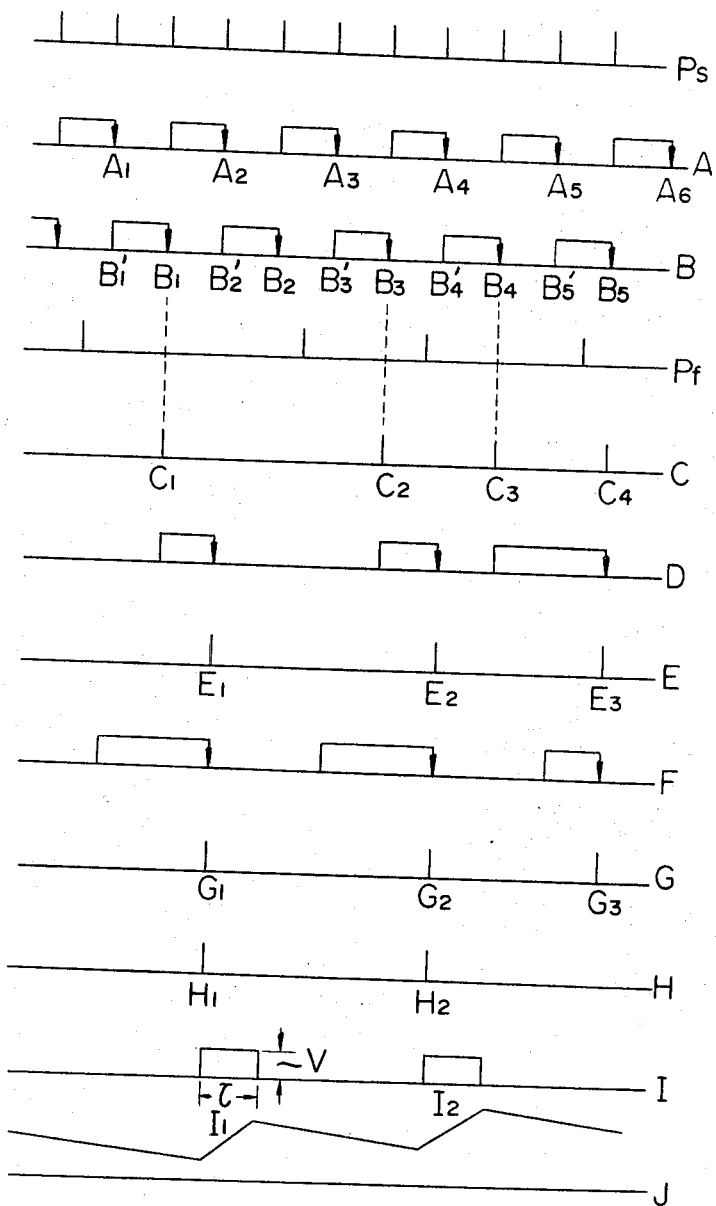
FIG. 3 is the time chart of the output voltage wave form at parts in FIG. 1.

Reference pulse trains A and B, as shown in the time chart of FIG. 3 are antiphase, to each other. Reference pulse signal B is fed to one input end of pulse-position modulator 3 as reset signal and converts a detected pulse signal $P_f$ introduced to the other input end of said circuit 3 as set signal into pulse signal C which will be synchronized with pulse signal B. Pulse signal C and reference pulse signal A are respectively and individually fed to flip-flop circuits 4 and 6 as trigger signals. Output signals D and F from flip-flop circuits 4 and 6 are respectively fed to pulse converters (differentiation circuits) 5 and 7 to obtain pulse signals E and G. Said signals E and G, are respectively fed to flip-flop circuits 6 and 4 as reset signals. Pulse signal E is obtained from the pulse converter 5 in two cases, when two pulses of pulse signal C are fed into the flip-flop circuit 4 in succession, and when, after one pulse of pulse signal C has entered the flip-flop circuit 4, a pulse of pulse signal G resets the flip-flop circuit 4.

On the other hand, pulse signal G is obtained from pulse converter 7 in two cases, when two pulses of reference pulse signal A are fed into the flip-flop circuit 6 in succession and when, after one pulse from reference pulse signal A has entered the flip-flop circuit 6, a pulse of pulse signal E resets flip-flop 6. Such will be described in more detail with reference to FIG. 3. In the time chart of FIG. 3 the condition of signals to actuate the circuits of FIG. 1 is shown by the arrows ↓. Pulses are generated in sequence from left to right in the drawing. First, pulse signal $A_1$ is generated to set the flip-flop 6. Since pulse signal $C_1$ is generated subsequent to the pulse signal $A_1$, the flip-flop circuit 4 is set next. Thirdly, pulse signal $A_2$ is generated after the pulse signal $C_1$, and the flip-flop circuit 6 is reset because two pulse signals A ($A_1$, $A_2$) enter the flip-flop circuit 6 in succession. The output signal F at the resetting of the flip-flop circuit 6 becomes pulse signal G after passing through the pulse converter 7.

When pulse $G_1$ is generated, the flip-flop circuit 4 is reset and generates pulse $E_1$. Hence at this time, the flip-flop circuits 4 and 6 return to the original state. Then the flip-flop circuits 4 and 6 are set by pulse signals $A_3$ and $C_2$ respectively, but because $A_4$ is generated earlier than pulse $C_3$, two pulse signals $A_3$ and $A_4$ enter the flip-flop circuit 6 successively and pulse signal $G_2$ is generated. When pulse signal $G_2$ is generated, the flip-flop circuit 4 is reset and pulse signal $E_2$ is generated and then the flip-flop circuits 4 and 6 return to the original state. Then, the flip-flop circuits 4 and 6 are set by pulse signals $C_3$ and $A_5$ in this order respectively, but because pulse signal $C_4$ has been generated earlier than pulse $A_6$, two pulse signals C ($C_1$ and $C_2$) enter the flip-flop circuit 4 in succession and the flip-flop circuit 4 is first reset and pulse signal $E_3$ is generated through the pulse converter 5. When pulse signal $E_3$ is generated, the flip-flop circuit 6 is reset and pulse signal $G_3$ is generated. In such a way, pulse signals E and G are obtained and classified into two types, respectively. That is, pulse signals $G_1$ and $G_2$ among pulse signals G are the ones which are obtained when two pulse signals A enter the flip-flop circuit 6 in succession and pulse signal $G_3$ is obtained when two pulse signals C enter the flip-flop circuit 4 in succession to thereby generate pulse signal E. In like manner, pulse signal E can be classified. Thus, difference in the pulse repetition rate between the pulse signal A and C can be distinguished if pulse signal G (or E) is divided into two types and only one of the two can be taken out. The reason is that, assuming that pulses which are the types of pulse signals $G_1$ and $G_2$ have been selected from pulse signals G (hereinafter this is called pulse signal H), the pulse repetition rate of the pulse signal H increases with the decrease in that of the detected pulse signal $P_f$; that is, the pulse repetition rate of the pulse signal H corresponds to difference in the pulse repetition rate between the pulse trains A and $P_f$.

The method of classifying pulse G (or E) into said two types is a very simple procedure. In taking pulse signal H from pulse train G, it is sufficient to feed the pulse signals G and B to an AND gate 8.

This will be described in more detail; for instance, the pulse signal $G_1$ occurs about at the same time as an up to down signal $A_2$ of signal A, but to be exact, the pulse signal $G_1$ occurs just a little behind the up to down signal $A_2$ of signal A (because $G_1$ will not occur unless $A_2$ is generated); that is, the pulse signal $G_1$ occurs just a little behind a down to up signal $B_2'$ of signal B. Pulse signal $G_2$ also occurs just a little behind a down to up signal $B_4'$ of signal B. Therefore in the present embodiment, pulse signal H has been obtained by feeding the pulse signal G and B to the AND gate 8, and the pulse signals $H_1$ and $H_2$ are obtained corresponding to pulse signals $G_1$ and $G_2$. On the other hand, as pulse signal $G_3$ occurs a little behind an up to down signal $B_5$ of signal B, no pulse signal H corresponding to pulse $G_3$ will occur. Further, with the use of another signal A' (not shown in the drawings) a little behind pulse train A instead of the signal B, signal H may be obtained by feeding pulse signal G and the signal A' to the AND gate 8.

Thus the pulse train Pf is compared with pulse train A and the pulse signal H the pulse repetition rate of which corresponds to the difference in the pulse repetition rate between the pulse trains Pf and A is obtained as an output of a comparison circuit 16.

Here the relation of the pulse repetition rate of the pulse signal H with difference between the pulse repetition rate of the reference pulse signal A and that of the detected pulse signal Pf will be described below.

Let the pulse repetition rates of the pulse signal H, the reference pulse signal A, the detected pulse signal Pf and the pulse signal C be $f_H$, $f_A$, $f_{Pf}$ and $f$, respectively, and let the pulse intervals of the reference pulse signal A, the detected pulse signal Pf and the pulse signal C be $T_A (=1/f_A)$, $T_{Pf}$ and $T_C$, respectively.

Since the pulse signal C is in synchronization with the reference pulse signal B, $T_C$ is an integral multiple of $T_A$. And as $T_{Pf}$ can be considered constant, $$T_{Pf} = (1/f_{Pf})$$

1.
$$f_{Pf} < \tfrac{1}{2} f_A \quad (1)$$
In the range of the formula (1),
$$T_{Pf} > 2T_A \text{ and } f_C = f_{Pf} \quad (2)$$
therefore,
$$T_C \cong 2T_A \quad (3)$$
That is, more than two reference pulse signals A occur in the interval $T_C$, and the pulse signal H occurs every two occurrences of the reference pulse signals A.
Therefore
$$f_H = \tfrac{1}{2} f_A \quad (4)$$

2.
$$\tfrac{1}{2} f_A \leq f_{Pf} < f_A \quad (5)$$
In the range of the formula (5),
$$T_A \leq T_{Pf} < 2T_A$$
$$f_C = f_{Pf}$$
Therefore
$$T_C = T_A \text{ or } T_C = 2T_A$$

Figure 4:
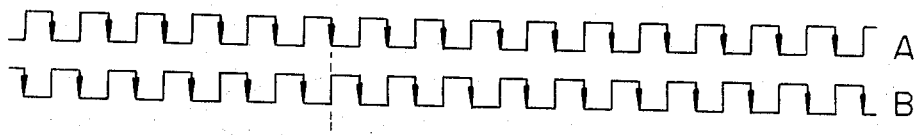
FIG. 4 is a time chart for observing the pulse repetition rate of output pulse signal of the comparison circuit.
Figures 1, 4:
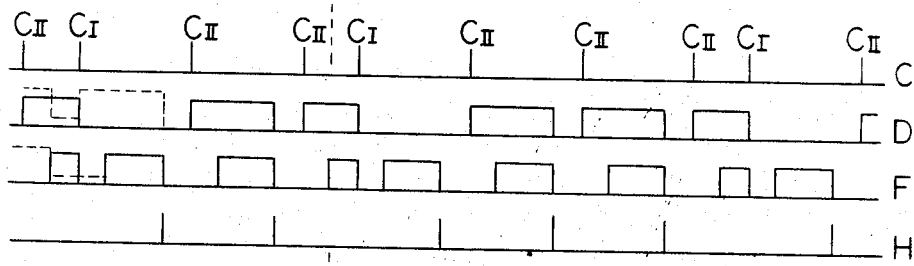
Figures 2, 4:
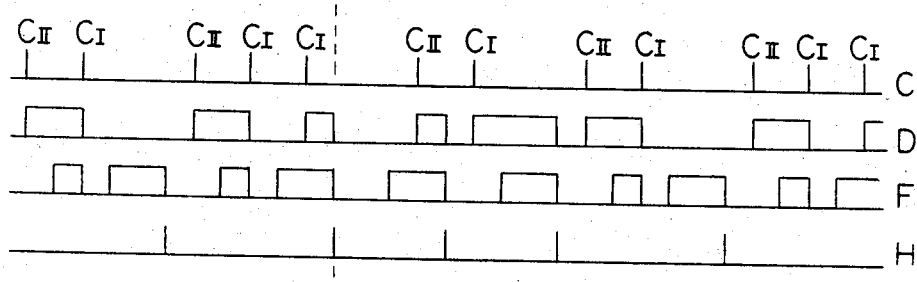
Figures 3, 4:
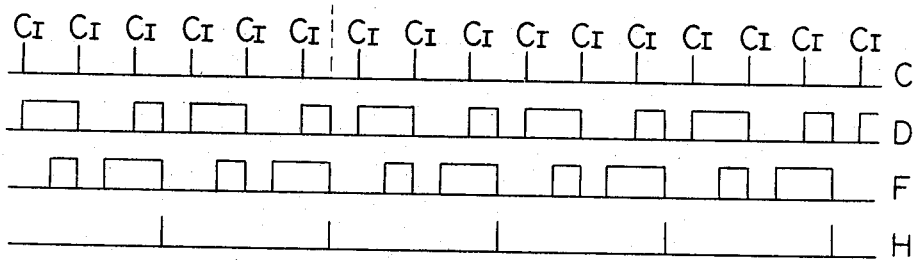

Let pulse signal C generating at pulse intervals $T_A$ and $2T_A$ be pulse signals $C_I$ and $C_{II}$, respectively and let the number of pulse signals $C_I$ and $C_{II}$ per second be $n_1$ and $n_2$.
$$n_1 + n_2 = f_C \quad (6)$$
$$T_A \times n_1 + 2T_A \times n_2 = 1 \quad (7)$$
As
$$T = 1/f_A,$$
$$n_1 = 2f_C - f_A \quad (8)$$
$$n_2 = f_A - f_C \quad (9)$$

a. In the range of the formula (5) and in case $n_1 \leq n_2$,
That is,
$$\tfrac{1}{2} f_A \leq f_{Pf} \leq \tfrac{2}{3} f_A \quad (10)$$
In the range of the formula (10),
$$3T_A \leq 2T_{Pf} \leq 4T_A$$
Therefore the pulse signal $C_I$ will not occur twice in succession with respect to the pulse signal C. One occurrence of the pulse signal $C_I$ occurring after the pulse signal $C_{II}$ is effective in cancelling one occurrence of the reference pulse signal A. That is, referring to FIG. 4–1, the initial pulse signal $C_I$ sets or resets the flip-flop circuit 4 depending on the initial state of the flip-flop circuit 4 (See the dotted line in FIG. 4–1.) However all the occurrences after the second occurrence inclusive, of the pulse signal $C_I$ will reset the flip-flop circuit 4 irrespectively of the initial state of the flip-flop circuit 4. The pulse signal E generated when the flip-flop circuit 4 is reset resets the flip-flop circuit 6 set by the reference pulse signal A. Thus the reference pulse signal A which has set the flip-flop circuit 6 is thought to have been cancelled with the pulse signal $C_I$. The occurrences of the reference pulse signal A other than the cancelled occurrence reset the flip-flop circuit 6 every two occurrences resulting in the generation of the pulse signal H.
Therefore
$$f_H = \tfrac{1}{2}(f_A - n_1) = f_A - f_C = f_A - f_{Pf} \quad (11)$$

b. In the range of the formula (5) and in case $n_1 > n_2$, that is in the range of the formula,
$$\tfrac{2}{3} f_A < f_{Pf} < f_A \quad (12)$$
$$2T_A < 2T_{Pf} < 3T_A$$
it happens that the pulse signal $C_I$ occurs two or more times in succession. In this case some occurrences of the pulse signal $C_I$ are effective and others are ineffective in cancelling the reference pulse A (See FIG. 4–2.) Some of them will set the flip-flop circuit 4 instead of resetting it. Thus the formula (11) fails in the range of the formula (12). In the range of the formula (12), the formula of $f_H$ is not determined. According to the actually measured value, $f_H$ is not linear in the same range.

3. In the range of
$$f_{Pf} > f_A \quad (13)$$
$$T_{Pf} < T_A \text{ therefore } f_C = f_A$$
In this case the pulse signal H occurs every three occurrences of the reference pulse signal A (See FIG. 4–3.)
Therefore
$$f_H = \tfrac{1}{3} f_A \quad (14)$$

From the above-described observations,
1. In the range of the formula
$$f_{Pf} < \tfrac{1}{2} f_A,$$
$$f_H = \tfrac{1}{2} f_A \quad (4)$$
2a. In the range of $\tfrac{1}{2} f_A \leq f_{Pf} \leq \tfrac{2}{3} f_A$
$$f_H = f_A - f_{Pf} \quad (11)$$
2b. In the range of $\tfrac{2}{3} f_A < f_{Pf} < f_A$
Vibrated
3. In the range of $f_A \leq f_{Pf}$
$$f_H = \tfrac{1}{3} f_A \quad (14)$$

Figure 5:
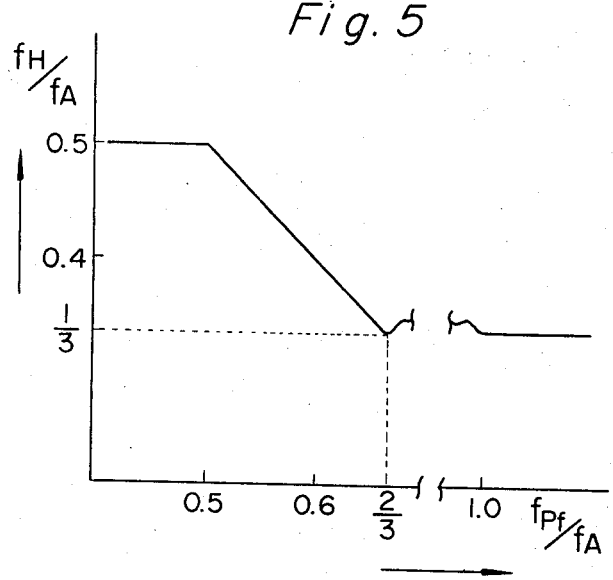
FIG. 5 is a graph showing inputs versus outputs in comparison circuit for two types of pulse signal.

The above results are diagrammatically illustrated in FIG. 5. Hence when the control system of the present invention is employed, $f_A$ and $f_{Pf}$ should be selected such that the formula $\tfrac{1}{2} < (f_{Pf}/f_A) < \tfrac{2}{3}$ is satisfied.

The pulse signal H thus obtained is converted into a rectangular wave signal I of wave having constant voltage V and width $\tau$.

In this embodiment the rectangular wave signal I is obtained from a flip-flop circuit 9 by feeding the pulse signal H and the reference pulse signal B to the set input end and the reset input end of the flip-flop circuit 9. The rectangular wave signal I occurs in synchronizing with the pulse signal H.

Figure 2:
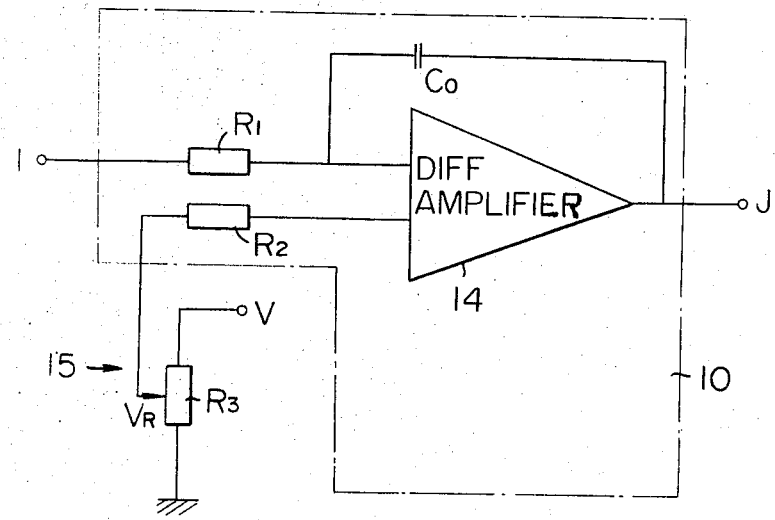
FIG. 2 is a circuit diagram showing a differential integrator and a reference voltage generator according to the invention.

The rectangular wave signal I and the reference voltage signal $V_R$ are fed to a differential integrator 10 composed of resistances $R_1$ and $R_2$, a differential amplifier 14, and condenser Co as shown in the circuit diagram of FIG. 2. In the present embodiment, the wave signal I and the reference voltage signal $V_R$ are respectively supplied to the ends of positive and negative inputs of the differential integrator 10.

The reference voltage signal $V_R$ is obtained by dividing the DC power supply voltage V supplied to the flip-flop circuit 9 by a variable resistance $R_3$, where the reference voltage signal $V_R$ is set so that an output signal J from the differential integrator 10 is well-balanced when difference between the pulse repetition rate of the reference pulse signal A and that of the detected pulse signal Pf is equal to a predetermined value K.

It is desirable that the rectangular wave signal I and the reference voltage signal $V_R$ always have a constant ratio, and in the present embodiment the DC power supply voltage V is common to the signals I and $V_R$ to avoid the effect of fluctuations of the DC power. However as the voltage of the signals I and $V_R$ can be regulated completely constantly, respectively, there is no need to use a common DC power supply voltage.

The voltage ej of the output signal J is expressed as $$ej \cong -\frac{1}{R_1C_0}\int V_R dt - V_R + \frac{1}{R_1C_0}\int ei\, dt \quad (15)$$

where ei ( = V or zero) is the voltage of the rectangular wave signal I.

Consequently when the pulse signal H ($H_1$ or $H_2$) occurs, the voltage ej rises for the time $\tau$ at the rate of $$(V - V_R/R_1Co) \text{ (volt/sec)} \quad (\because ei = V)$$

while, when no pulse signal H occurs, the voltage ej falls at the rate of $$-(V_R/R_1Co) \text{ (volt/sec)} \quad (\because ei = \text{zero})$$

as shown FIG. 3.

In the above example, the pulse signal H obtained by classifying the pulse signal G is in use. However a pulse signal H' (not shown in FIG. 3) obtained by leading the pulse signal E and the reference pulse signal A into AND gate 8 may be used. In this case the pulse signal H' would be converted to a rectangular wave signal I' (not shown in FIG. 3) and the rectangular wave signal I' would be led into the end of the negative input of the differential integrator.

A regulator 11, for example, a phase control circuit for operating a motor, is controlled by the output J, and thereby a rotary machine 12 to be controlled is driven.

A detector 13, for example, an electromagnetic pickup, is connected with the rotary machine and generates the detected pulse signal Pf corresponding to the velocity of the rotary machine.

Another embodiment of the invention is as follows; for the pulse generator I for setting a pulse train Ps a UJT oscillator is employed; the frequency of generation in the generator is 3,700 Hz; for a flip-flop circuit 2, a pulse-position modulator 3 composed of a flip-flop of R-S type, flip-flop circuits 4, 6, pulse converters (differential circuits) 5 and 7, AND gate 8, and the flip-flop circuit 9, semi-conductor integrated circuits are employed. The width $\tau$ of the rectangular wave is 1/2,700 sec. The differential integrator 10 has input resistances $R_1$ and $R_2$ of 500 $K\Omega$, a condenser capacitance Co of 0.2 $\mu$F and a differential amplifier 14 having a degree of amplification of $10^6$ and an input impedance of about $10^{10}$ ohms. The rotating velocity of said DC motor is detected by an electromagnetic pickup of 60 PPR.

In this case, as $f_A = 1,850$ Hz, in the range of $\frac{1}{2}f_A < f_{Pf} < \frac{2}{3}f_A$, that is, 925 Hz $< f_{Pf} <$ 1,233 Hz, the desired value can be altered by varying the reference voltage signal $V_R$ without changing $f_A$.

For instance, suppose that the desired value of rotary velocity of the rotary machine 12 is 1,000 rpm.
$f_{Pf} = (1,000 \text{ (rpm)}/60 \text{ (sec)}) \times 60 \text{ (PFR)} = 1,000$ Hz
From the formula (11),
$f_H = f_A - f_{Pf} = 850$
Hence points of FIG. 5 (1,000/1,850, 850/1,850) correspond to the setting points. Further the 850 Hz corresponds to the above-described predetermined value K.

And as $R_1 = 500\ K\Omega$, Co = 0.2 $\mu$F, $\tau = ((1/2,700))$ sec, from the formula (15)

$$ej = -(1/R_1Co) \times V_R - V_R + (1/R_1Co) \times V \times \tau \times f_H = -11V_R + (85/37)V$$

If the regulator 11 is designed such that ej is in equilibrium at zero volt, $$(V_R/V) = (85/37 \times 11) \quad (17)$$

That is, if $V_R/V$ is set to a ratio satisfying the formula (17), the desired value will be 1,000 rpm.

When the rotary velocity of the rotary machine 12 decreases to 999 rpm, $f_{Pf}$ will be 999 Hz and $f_H$ 851 Hz. Therefore ej increases $(1/370) \times V$ (volt) per second and the regulator 11 works such that the rotary velocity of the rotary machine 12 is increased.

The above description is for an embodiment for use in a rotary machine, but the present invention is not limitative to the control of velocity of the rotary machine. Anything in which its controlled variable occurs as variations in the pulse repetition rate can be controlled. For instance, in the case of control of temperature, if a mechanism generating a pulse train having a pulse repetition rate corresponding to temperature is provided (for example, quartz-crystal vibrator), temperature control is possible by the controller of the present invention.

We claim:

1. An automatic controller comprising
   a. a detector for generating a detected pulse signal Pf the pulse repetition rate of which corresponds to the controlled variable of a controlled device,
   b. a circuit means for generating two reference pulse signals A and B in antiphase with each other having the pulse repetition rates different by a predetermined value from the pulse repetition rate of the detected pulse signal Pf occurring when the controlled variable is equal to a desired value,
   c. a circuit means for generating a reference voltage signal $V_R$
   d. a circuit means for synchronizing the detected pulse signal Pf with one of the reference pulse signals B and generating the pulse signal C thus synchronized, e. a comparison circuit for comparing the other reference pulse signal A and the pulse signal C and generating a pulse signal H the pulse repetition rate of which corresponds to difference between the pulse repetition rates of the two pulse signals, f. a circuit means for generating a rectangular wave signal I synchronized with the pulse signal H and having waves of predetermined voltage and width g. a differential integrator for receiving the rectangular wave signal I and the reference voltage signal $V_R$ as inputs and h. a regulator for receiving the output signal J of the differential integrator and actuating a manipulated value.

2. The automatic controller as set forth in claim 1 in which it characterized in that the power source for the circuit generating the reference voltage signal $V_R$ and the circuit for generating the rectangular wave signal I is one and the same.

* * * * *